(12) United States Patent
Williams et al.

(10) Patent No.: US 9,937,823 B2
(45) Date of Patent: Apr. 10, 2018

(54) CHILD SAFETY SEAT

(71) Applicant: Wonderland Nurserygoods Company Limited, Tuen Mun, N.T. (HK)

(72) Inventors: Bruce L. Williams, Narvon, PA (US); Gregory S. Sellers, Christiana, PA (US)

(73) Assignee: Wonderland Switzerland AG (CH)

( * ) Notice: Subject to any disclaimer, the term of this patent is extended or adjusted under 35 U.S.C. 154(b) by 0 days.

(21) Appl. No.: 15/295,106

(22) Filed: Oct. 17, 2016

(65) Prior Publication Data

US 2017/0106772 A1    Apr. 20, 2017

Related U.S. Application Data

(60) Provisional application No. 62/243,922, filed on Oct. 20, 2015.

(51) Int. Cl.
  *B60N 2/26* (2006.01)
  *B60N 2/28* (2006.01)

(52) U.S. Cl.
  CPC ................ *B60N 2/2812* (2013.01)

(58) Field of Classification Search
  CPC ....................................... B60N 2/2812
  USPC ........................ 297/256.14, 256.16
  See application file for complete search history.

(56) References Cited

U.S. PATENT DOCUMENTS

| | | | | |
|---|---|---|---|---|
| 5,611,596 A * | 3/1997 | Barley | ........... | B60N 2/2806 297/256.13 |
| 5,839,789 A * | 11/1998 | Koledin | ........... | B60N 2/2806 297/250.1 |
| 5,915,787 A * | 6/1999 | Brookman | ........... | B60N 2/2806 297/256.16 |
| 6,220,662 B1 * | 4/2001 | Franco-Vila | ........... | B60N 2/2806 297/256.16 X |
| 6,672,664 B2 * | 1/2004 | Yanaka | ........... | B60N 2/2806 297/256.16 X |
| 6,764,135 B2 * | 7/2004 | Sasaki | ........... | B60N 2/2806 297/256.16 X |
| 7,029,068 B2 * | 4/2006 | Yoshida | ........... | B60N 2/2806 297/250.1 |
| 7,163,265 B2 * | 1/2007 | Adachi | ........... | B60N 2/2806 297/256.16 X |
| 7,300,113 B2 * | 11/2007 | Baloga | ........... | B60N 2/2803 297/256.16 X |
| 7,901,003 B2 | 3/2011 | Meeker et al. | | |
| 8,444,222 B2 * | 5/2013 | Buckingham | ........ | B60N 2/2806 297/256.16 X |

(Continued)

OTHER PUBLICATIONS

Examiner's Report dated Aug. 2, 2017 in co-pending CA Appl. No. 2,945,466.

*Primary Examiner* — Rodney B White

(57) ABSTRACT

A child safety seat includes a seat shell, and a first and a second belt restraining member respectively connected with the seat shell. The seat shell has a shell surface, and a first and a second opening for selective passage of an anchoring belt to attach the child safety seat on a vehicle seat in two different configurations, which include a rearward and a forward facing configuration. The first belt restraining member is independently operable to press against an anchoring belt passing through the first opening, and the second belt restraining member is independently operable to press against an anchoring belt passing through the second opening.

21 Claims, 5 Drawing Sheets

(56) References Cited

U.S. PATENT DOCUMENTS

| | | |
|---|---|---|
| 8,845,022 B2 | 9/2014 | Strong et al. |
| 9,162,593 B2 * | 10/2015 | Spence ................ B60N 2/265 |
| 9,499,074 B2 * | 11/2016 | Strong ................ B60N 2/2806 |
| 2001/0004163 A1 * | 6/2001 | Yamazaki ............ B60N 2/2806 297/256.16 |
| 2011/0140491 A1 * | 6/2011 | Williams ............ B60N 2/2806 297/256.16 |
| 2011/0272983 A1 * | 11/2011 | Fritz .................. B60N 2/2806 297/250.1 |
| 2014/0062150 A1 | 3/2014 | Strong et al. |
| 2015/0115676 A1 | 4/2015 | Strong et al. |
| 2015/0183341 A1 * | 7/2015 | Carpenter ............ B60N 2/2821 297/256.16 |

* cited by examiner

CHILD SAFETY SEAT

CROSS-REFERENCE TO RELATED APPLICATION(S)

This application claims priority to U.S. Provisional Patent Application No. 62/243,922 filed on Oct. 20, 2015, the disclosure of which is incorporated herein by reference.

BACKGROUND

1. Field of the Invention

The present invention relates to child safety seats.

2. Description of the Related Art

A child safety seat is typically used in an automobile vehicle to properly restrain a child in the event of accidental collision. It is widely known that a child safety seat that is placed in a rear facing position can provide better protection, because it can distribute crash forces over a larger portion of the body (i.e., child's head and torso). Accordingly, safety experts and car seat manufacturers usually recommend to seat children in a vehicle in a rear facing configuration until the age of 2 years old. As the child grows older, the child safety seat then may be installed in a forward facing configuration.

The installation of the child safety seat usually requires securely attaching the child safety seat on the vehicle seat with a vehicle seatbelt or a harness separately provided. This can be so difficult to achieve with certain child safety seats that a caregiver may need to climb into the vehicle and press down on the child safety seat while pulling on the vehicle seatbelt.

Therefore, there is a need for an improved child safety seat that allows convenient attachment on a vehicle seat with minimal effort, and can address at least the foregoing issues.

SUMMARY

The present application describes a child safety seat including a belt tensioning mechanism that is easy to operate and can provide proper tension in an anchoring belt for securely attaching the child safety seat on a vehicle seat in a rearward or forward facing configuration. The child safety seat includes a seat shell, and a first and a second belt restraining member respectively connected with the seat shell. The seat shell has a shell surface, a first opening for passage of an anchoring belt to attach the child safety seat on a vehicle seat in a first configuration, and a second opening for passage of an anchoring belt to attach the child safety seat on a vehicle seat in a second configuration different from the first configuration, the first and second configurations including a rearward facing configuration and a forward facing configuration. Each of the first and second belt restraining members respectively has a clamping state for pressing an anchoring belt adjacently to the shell surface, and a release state for facilitating installation or removal of the anchoring belt. Moreover, each of the first and second belt restraining members is independently rotatable relative to the seat shell between the release state and the clamping state, the first belt restraining member being independently rotatable to the clamping state for pressing against an anchoring belt passing through the first opening, and the second belt restraining member being independently rotatable to the clamping state for pressing against an anchoring belt passing through the second opening.

According to another embodiment, the child safety seat includes a seat shell, a belt restraining member connected with the seat shell, and a guard connected with the belt restraining member. The seat shell has a shell surface, and an opening for passage of an anchoring belt to attach the child safety seat on a vehicle seat. The belt restraining member is disposed in a region overlapping with a belt path passing through the opening, the belt restraining member having a clamping state for pressing an anchoring belt adjacently to the shell surface, and a release state for facilitating installation or removal of the anchoring belt. The guard is movable to open and close the opening.

DETAILED DESCRIPTION OF THE EMBODIMENTS

Figure 1:
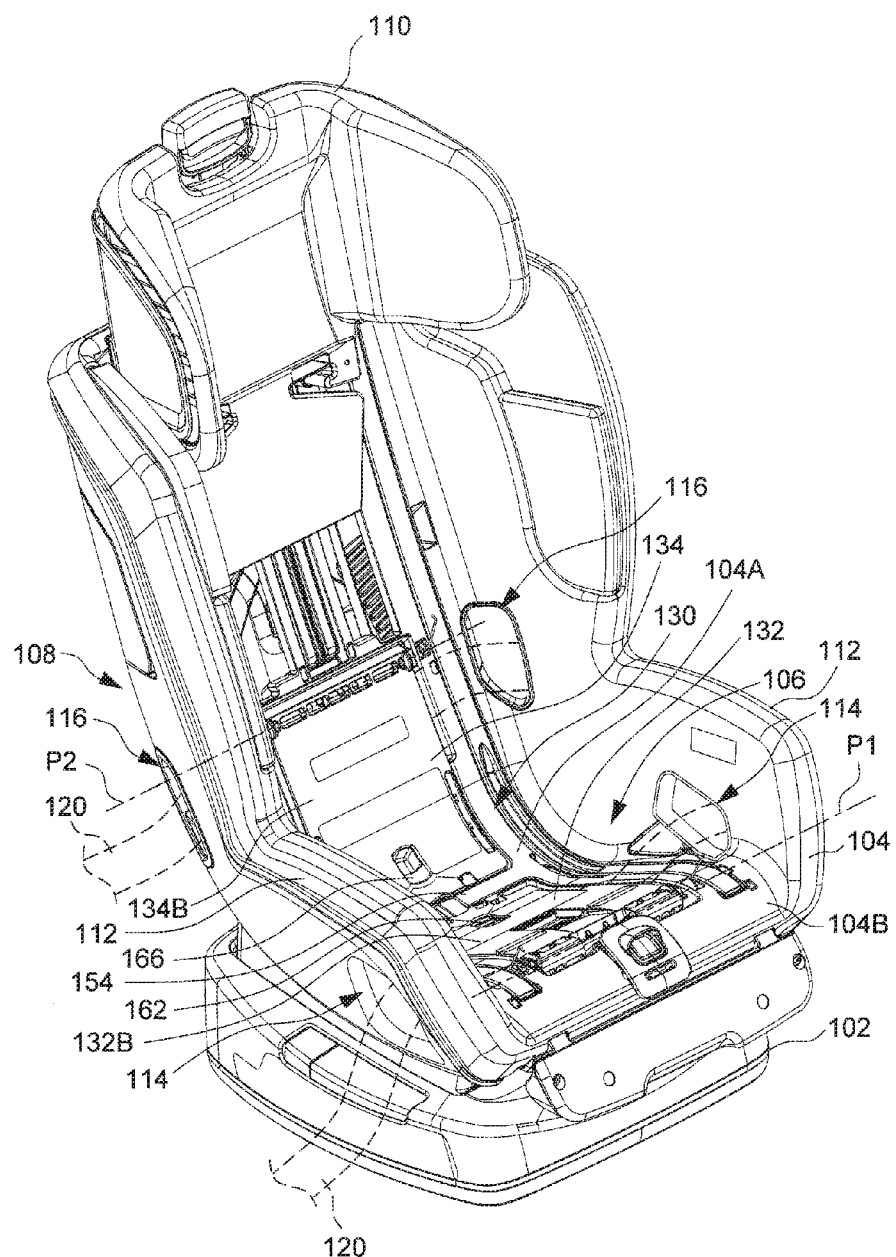
FIG. 1 is a perspective view illustrating an embodiment of a child safety seat having a belt tensioning mechanism in a clamping state.

FIG. 1 is a perspective view illustrating an embodiment of a child safety seat 100. The child safety seat 100 can include a base 102, and a seat shell 104 assembled with the base 102. The base 102 can provide stable support for installation of the child safety seat 100 on a vehicle seat. The seat shell 104 can include a seat portion 106, a backrest portion 108, and a headrest 110 that may be vertically adjusted along the backrest portion 108 to adapt to a child size. Moreover, the seat shell 104 may be slidably adjustable relative to the base 102 between a plurality of recline positions for facilitating installation and positioning of the child seat safety seat 100 on a vehicle seat.

The seat shell 104 has a shell surface 104A that extends along the seat portion 106 and the backrest portion 108. The shell surface 104A can be sideways delimited between two sidewalls 112 that respectively extend along a left and a right side of the seat portion 106 and the backrest portion 108. Moreover, the seat shell 104 has two openings 114 respectively provided through the two sidewalls 112 in a region corresponding to the seat portion 106, and two openings 116 respectively provided through the two sidewalls 112 in a region corresponding to the backrest portion 108. The two openings 114 can be disposed symmetric to each other near a front 104B of the seat shell 104, and the two openings 116 can be disposed symmetric to each other behind the two openings 114. The two sets of openings 114 and 116 respectively define two different belt paths that can be used for attaching the child safety seat 100 in a rearward or forward facing configuration. More specifically, an anchoring belt 120 (shown with phantom lines) may transversally pass through either of the two openings 114 near the front 104B of the seat shell 104 for attaching the child safety seat 100 on a vehicle seat in a rearward facing configuration (i.e., the front 104B of the seat shell 104 facing a seatback of the vehicle seat), or through the two openings 116 adjacent to the backrest portion 108 for attaching the child safety seat 100 on a vehicle seat in a forward facing configuration (i.e., the front 104B of the seat shell 104 facing a front of the vehicle seat). The anchoring belt 120 can be a vehicle seatbelt, or a harness separately provided.

Figure 2:
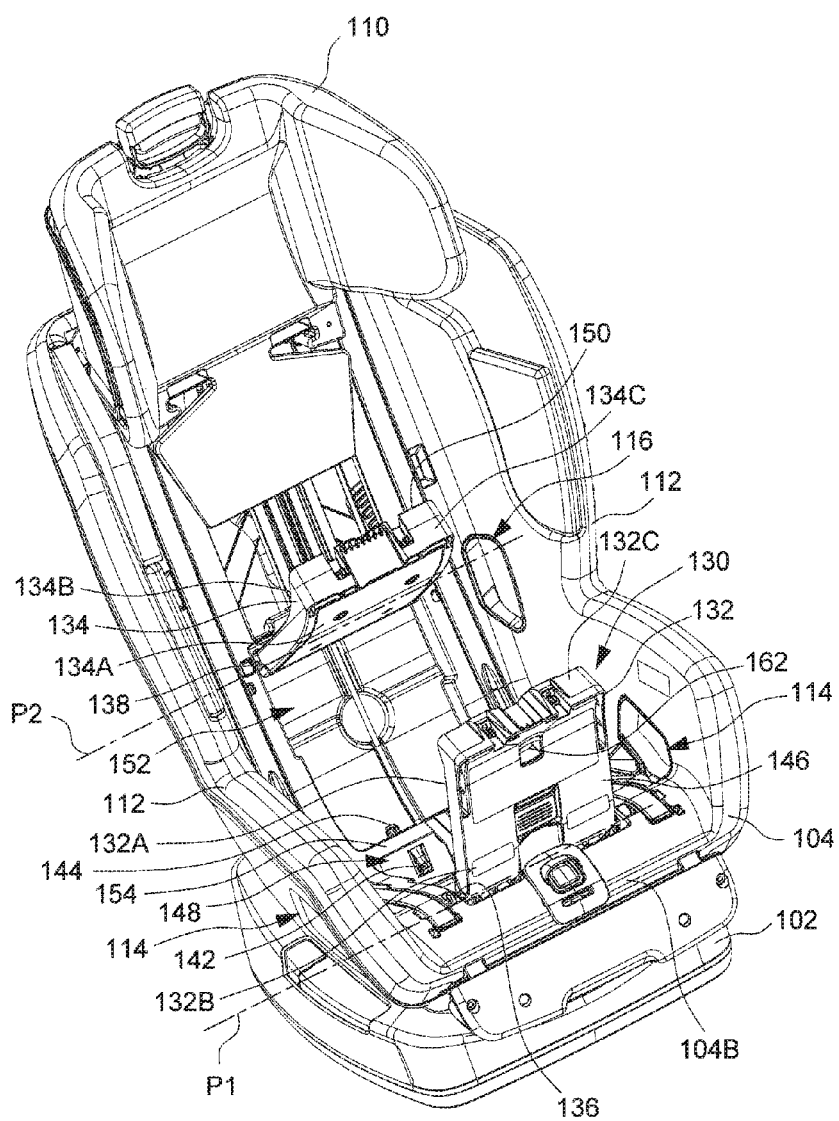
FIG. 2 is a perspective view illustrating the child safety seat of FIG. 1 with the belt tensioning mechanism in a release state.
Figure 3:
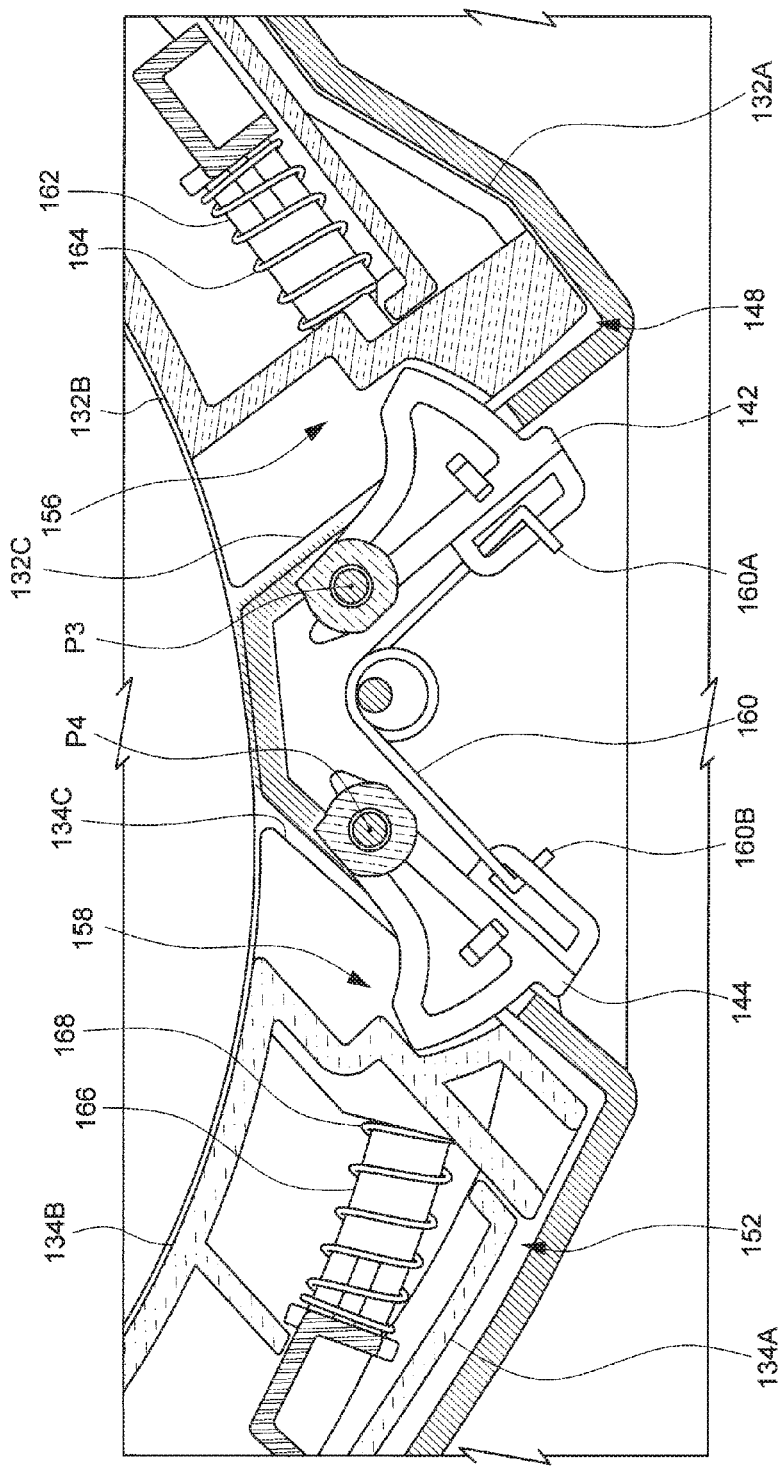
FIG. 3 is a schematic view illustrating a portion of the belt tensioning mechanism provided in the child safety seat.

Referring to FIG. 1, the child safety seat 100 can further include a belt tensioning mechanism 130 operable to tension the anchoring belt 120 for ensuring tight attachment of the child safety seat 100. In conjunction with FIG. 1, FIG. 2 is a schematic view illustrating the belt tensioning mechanism 130 in a release state, and FIG. 3 is a schematic view illustrating a portion of the belt tensioning mechanism 130. Referring to FIGS. 1-3, the belt tensioning mechanism 130 can include two belt restraining members 132 and 134 respectively connected with the seat shell 104, two springs 136 and 138, and two latches 142 and 144.

The belt restraining member 132 is pivotally connected with the seat shell 104 about a pivot axis P1 extending transversally relative to the seat shell 104. The belt restraining member 132 has two surfaces 132A and 132B opposite to each other, and an end edge 132C at a free end of the belt restraining member 132 that is generally parallel to the pivot axis P1. According to an exemplary construction, the belt restraining member 132 can have a panel 146, the two surfaces 132A and 132B can be two opposite major surfaces of the panel 146, and the end edge 132C can be an edge of the panel 146 distant from the pivot axis P1. It will be appreciated, however, that the belt retraining member 132 can have other shapes, such as a plate, a beam, a bar, etc. The region where is placed the belt restraining member 132 can overlap with the belt path through the two openings 114, but not the belt path through the two openings 116.

The belt restraining member 132 has a clamping state (as shown in FIG. 1) for pressing the anchoring belt 120 adjacently to the shell surface 104A, and a release state (as shown in FIG. 2) for facilitating installation or removal of the anchoring belt 120. Moreover, the belt restraining member 132 can independently rotate about the pivot axis P1 relative to the seat shell 104 between the release state and the clamping state. The surface 132A can rise away from the shell surface 104A when the belt restraining member 132 is in the release state, and the surface 132A can be adjacent to the shell surface 104A when the belt restraining member 132 is in the clamping state. According to an example of implementation, the shell surface 104A can have a recess 148, and the belt restraining member 132 can be at least partially (e.g., the surface 132A thereof) received in the recess 148 when the belt restraining member 132 is in the clamping state. When it is in the clamping state, the surface 132A of the belt restraining member 132 can press against an anchoring belt 120 passing through the two openings 114, which convolutes the anchoring belt 120 and provides tension in the anchoring belt 120 for a secure attachment of the child safety seat 100.

For convenient installation of the anchoring belt 120, the belt restraining member 132 can be biased by the spring 136 to the release state. The spring 136 can be exemplary a torsion spring disposed coaxial to the pivot axis P1 and having two ends respectively anchored with the belt restraining member 132 and the seat shell 104.

Referring again to FIGS. 1-3, the belt restraining member 134 is pivotally connected with the seat shell 104 about a pivot axis P2 extending transversally relative to the seat shell 104 and parallel to the pivot axis P1 of the belt restraining member 132. The belt restraining member 134 has two surfaces 134A and 134B opposite to each other, and an end edge 134C at a free end of the belt restraining member 134 that is generally parallel to the pivot axis P2. According to an exemplary construction, the belt restraining member 134 can have a panel 150, the two surfaces 134A and 134B can be two opposite major surfaces of the panel 150, and the end edge 134C can be an edge of the panel 150 distant from the pivot axis P2. It will be appreciated, however, that the belt retraining member 134 can have other shapes, such as a plate, a beam, a bar, etc. The region where is placed the belt restraining member 134 can overlap with the belt path through the two openings 116, but not the belt path through the two openings 114. Accordingly, the belt restraining members 132 and 134 can be disposed in two distinct regions on the seat shell 104 that do not overlap with each other.

The belt restraining member 134 has a clamping state (as shown in FIG. 1) for pressing the anchoring belt 120 adjacently to the shell surface 104A, and a release state (as shown in FIG. 2) for facilitating installation or removal of the anchoring belt 120. Moreover, the belt restraining member 134 can independently rotate about the pivot axis P2 relative to the seat shell 104 between the release state and the clamping state. The surface 134A can rise away from the shell surface 104A when the belt restraining member 134 is in the release state, and the surface 134A can be adjacent to the shell surface 104A when the belt restraining member 134 is in the clamping state. According to an example of implementation, the shell surface 104A can have a recess 152 separate from the recess 148, and the belt restraining member 134 can be at least partially (e.g., the surface 134A thereof) received in the recess 152 when the belt restraining member 134 is in the clamping state. When it is in the clamping state, the surface 134A of the belt restraining member 134 can press against an anchoring belt 120 passing through the two openings 116, which convolutes the anchoring belt 120 and provides tension in the anchoring belt 120 for a secure attachment of the child safety seat 100.

For convenient installation of the anchoring belt 120, the belt restraining member 134 can be biased by the spring 138 to the release state. The spring 138 can be exemplary a torsion spring disposed coaxial to the pivot axis P2 and having two ends respectively anchored with the belt restraining member 134 and the seat shell 104.

Referring to FIGS. 1-3, the two latches 142 and 144 can be assembled with the seat shell 104 in a region 154 located between the two recesses 148 and 152. The region 154 can be a hollow protrusion that separates the two recesses 148 and 152, and the latches 142 and 144 can be assembled inside the hollow protrusion. The latch 142 can be pivotally connected with the seat shell 104 about a pivot axis P3 that is generally parallel to the pivot axes P1 and P2, and the latch 144 can be pivotally connected with the seat shell 104 about a pivot axis P4 that is generally parallel to the pivot axes P1, P2 and P3. The two latches 142 and 144 can be disposed adjacent to each other in the region 154 of the seat shell 104.

The latches 142 and 144 are operable independently from each other to respectively lock and unlock the belt restraining members 132 and 134, the latch 142 engaging with the free end of the belt restraining member 132 to lock the belt restraining member 132 in the clamping state, and the latch 144 engaging with the free end of the belt restraining member 134 to lock the belt restraining member 134 in the clamping state. More specifically, the latch 142 can protrude outside the hollow protrusion of the region 154, and engage with a notch 156 (better shown in FIG. 3) provided in the end edge 132C of the belt restraining member 132 to prevent its rotation about the pivot axis P1, thereby locking the belt restraining member 132 in the clamping state. The latch 144 can protrude outside the hollow protrusion of the region 154 at a side opposite to that of the latch 142, and engage with a notch 158 (better shown in FIG. 3) provided in the end edge 134C of the belt restraining member 134 to prevent its rotation about the pivot axis P2, thereby locking the belt restraining member 134 in the clamping state.

Referring to FIG. 3, the two latches 142 and 144 can be respectively spring biased toward a locking state for respectively engaging with the two belt restraining members 132 and 134. For example, the seat shell 104 can be assembled with a spring 160 that has two ends 160A and 160B respectively anchored with the two latches 142 and 144. The spring 160 can bias the two latches 142 and 144 toward the locking state for respective engagement with the two belt restraining members 132 and 134. Rather than one spring, it will be appreciated that two springs may also be provided respectively coupling with the two latches 142 and 144.

Referring to FIGS. 1-3, the belt restraining member 132 can be assembled with a release actuator 162 that is exposed outward on the surface 132B. For example, the release actuator 162 can be slidably connected with the belt restraining member 132 near the end edge 132C thereof. The release actuator 162 can move relative to the belt restraining member 132 between a first position retracted toward an interior of the belt restraining member 132, and a second position protruding outward at the end edge 132C of the belt restraining member 132. While the belt restraining member 132 is in the clamping state, a sliding displacement of the release actuator 162 from the first position to the second position causes the release actuator 162 to push against the latch 142, which urges the latch 142 to move and disengage from the end edge 132C, thereby unlocking the belt restraining member 132. A spring 164 can have two ends respectively connected with the release actuator 162 and the belt restraining member 132. The spring 164 can bias the release actuator 162 toward the first position.

Likewise, the belt restraining member 134 can be assembled with a release actuator 166 that is exposed outward on the surface 134B. For example, the release actuator 166 can be slidably connected with the belt restraining member 134 near the end edge 134C thereof. The release actuator 166 can move relative to the belt restraining member 134 between a first position retracted toward an interior of the belt restraining member 134, and a second position protruding outward at the end edge 134C of the belt restraining member 134. While the belt restraining member 134 is in the clamping state, a sliding displacement of the release actuator 166 from the first position to the second position causes the release actuator 166 to push against the latch 144, which urges the latch 144 to move and disengage from the end edge 134C, thereby unlocking the belt restraining member 134. A spring 168 can have two ends respectively connected with the release actuator 166 and the belt restraining member 134. The spring 168 can bias the release actuator 166 toward the first position.

Exemplary operation of the belt tensioning mechanism 130 is described hereinafter. Suppose that the child safety seat 100 is to be attached on a vehicle seat in a rearward facing configuration. While the belt restraining member 134 remains in the clamping state, the belt restraining member 132 can be independently operated for installing and tensioning an anchoring belt 120 that is threaded through the two openings 114. More specifically, a caregiver can operate the release actuator 162, which can urge the latch 142 to disengage and unlock the belt restraining member 132 as described previously. The belt restraining member 132 once unlocked can be rotated from the clamping state to the release state, this rotation being facilitated by the biasing action applied by the spring 136 on the belt restraining member 132. The anchoring belt 120 then can be threaded transversally through the two openings 114, and extend across a space between the belt restraining member 132 and the shell surface 104A. Then the belt restraining member 132 can be manually rotated toward the shell surface 104A to the clamping state, which presses the anchoring belt 120 into the recess 148 of the seat shell 104, thereby tensioning the anchoring belt 120. Once the belt restraining member 132 reaches the clamping state, the spring 160 can urge the latch 142 to engage with the end edge 132C so as to lock the belt restraining member 132 in position.

For releasing the anchoring belt 120 from the clamping action of the belt restraining member 132, the release actuator 162 can be operated to unlock the belt restraining member 132 as described previously. Once it is unlocked, the belt restraining member 132 can be rotated from the clamping state to the release state for releasing the anchoring belt 120.

Alternatively, suppose that the child safety seat 100 is to be attached on a vehicle seat in a forward facing configuration. While the belt restraining member 132 remains in the clamping state, the belt restraining member 134 can be independently operated for installing and tensioning an anchoring belt 120 that is threaded through the two openings 116. More specifically, a caregiver can operate the release actuator 166, which can urge the latch 144 to disengage and unlock the belt restraining member 134 as described previously. The belt restraining member 134 once unlocked can be rotated from the clamping state to the release state, this rotation being facilitated by the biasing action applied by the spring 138 on the belt restraining member 134. The anchoring belt 120 then can be threaded transversally through the two openings 116, and extend across a space between the belt restraining member 134 and the shell surface 104A. Then the belt restraining member 134 can be manually rotated toward the shell surface 104A to the clamping state, which presses the anchoring belt 120 into the recess 152 of the seat shell 104, thereby tensioning the anchoring belt 120. Once the belt restraining member 134 reaches the clamping state, the spring 160 can urge the latch 144 to engage with the end edge 134C so as to lock the belt restraining member 134 in position.

For releasing the anchoring belt 120 from the clamping action of the belt restraining member 134, the release actuator 166 can be operated to unlock the belt restraining member 134 as described previously. Once it is unlocked, the belt restraining member 134 can be rotated from the clamping state to the release state for releasing the anchoring belt 120.

Figure 4:
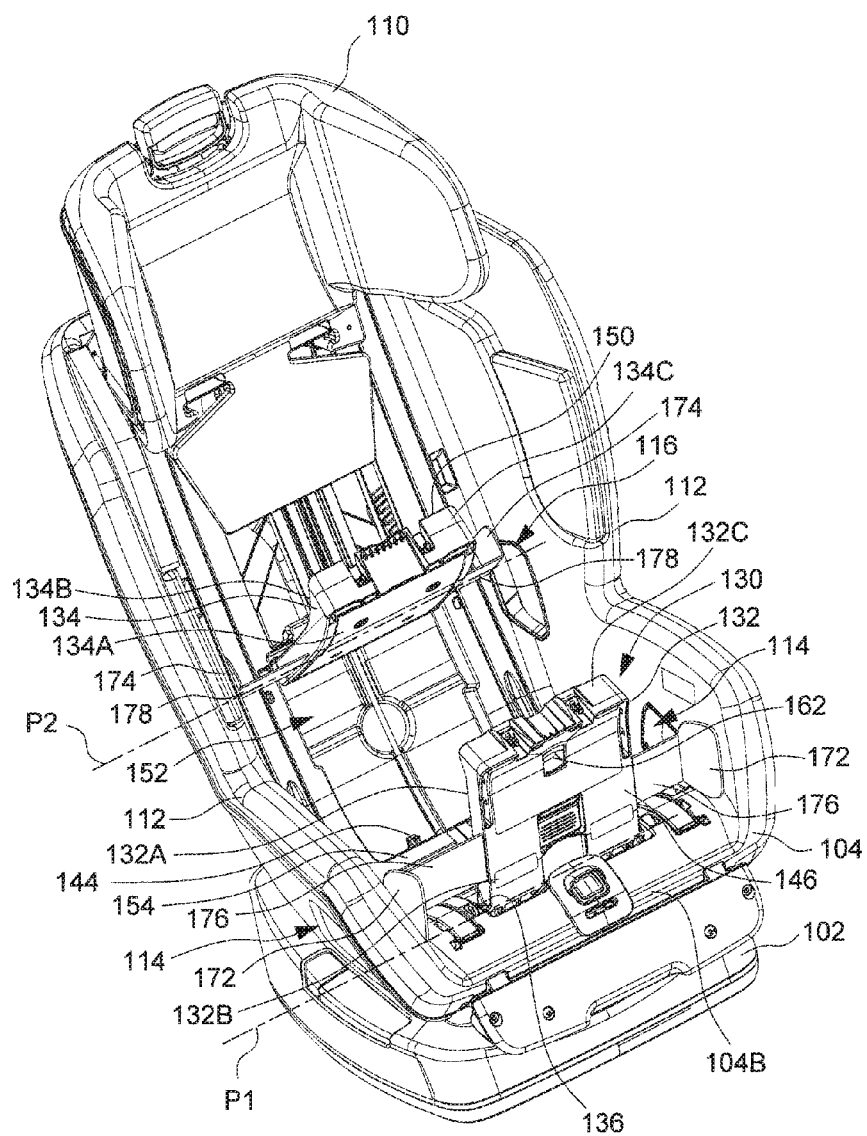
FIGS. 4 and 5 are schematic views illustrating a variant construction of the child safety seat provided with a safety mechanism for closing multiple belt paths in the child safety seat.
Figure 5:
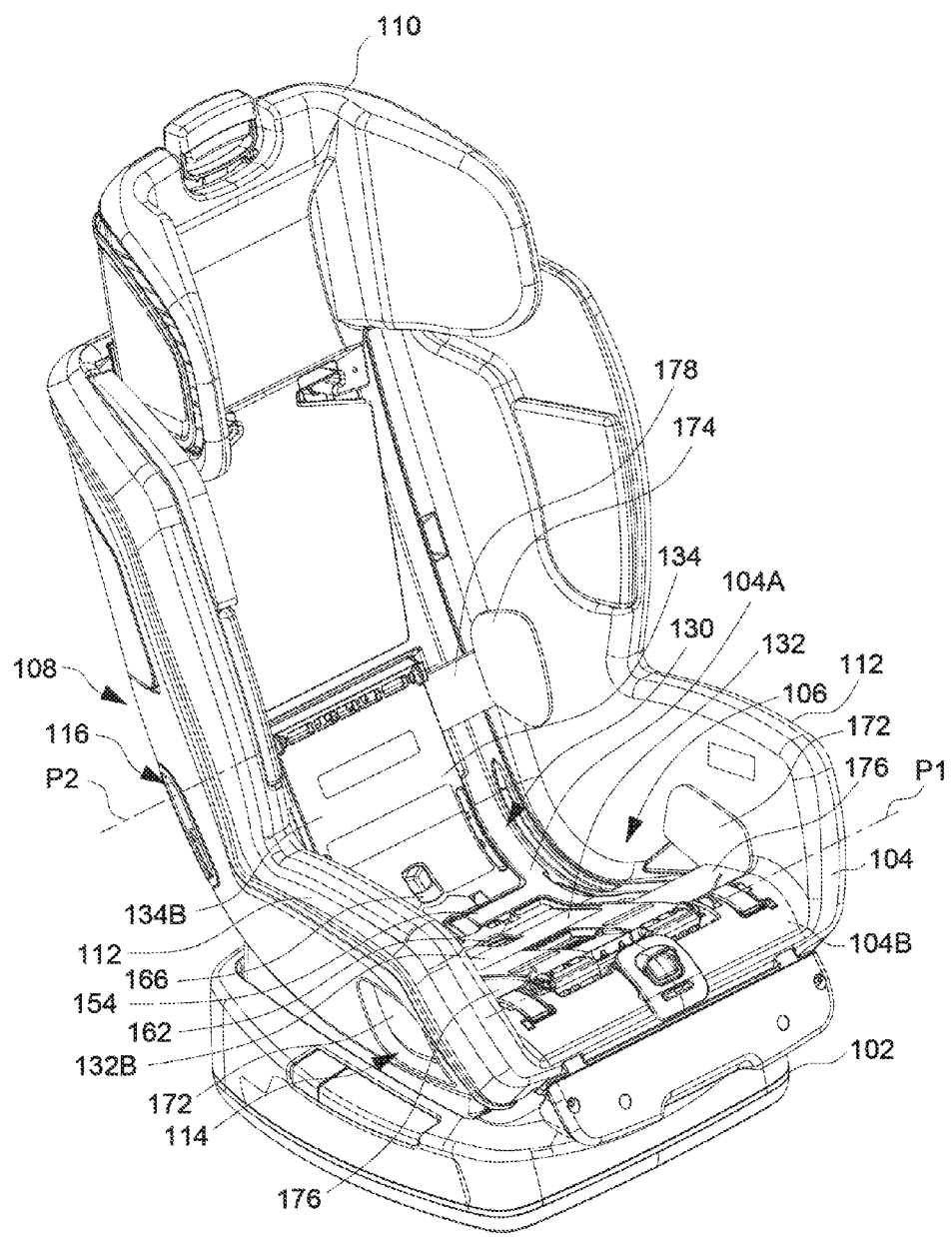

FIGS. 4 and 5 are schematic views illustrating a variant construction of the child safety seat 100. The child safety seat 100 shown in FIGS. 4 and 5 includes the same belt tensioning mechanism 130 described previously. A difference of the construction shown in FIGS. 4 and 5 is that the belt restraining member 132 further includes two guards 172, and the belt restraining member 134 further includes two guards 174.

Referring to FIGS. 4 and 5, the two guards 172 are respectively disposed at a left and a right side of the panel 146 of the belt restraining member 132, near the two sidewalls 112. The two guards 172 can be respectively connected fixedly with the left and right side of the panel 146, e.g., via two arms 176. In this manner, the two guards 172 can move in unison with the belt restraining member 132 to respectively open or close the two openings 114 when the belt restraining member 132 is pivotally switched between the release state and the clamping state. In particular, the two guards 172 can substantially close the two openings 114 when the belt restraining member 132 is in the clamping state (as shown in FIG. 5), and substantially open the two openings 114 when the belt restraining member 132 is in the release state (as shown in FIG. 4). When the two guards 172 close the two openings 114, a narrow slit can be left between the border of each guard 172 and a rim of the corresponding opening 114 for passage of an anchoring belt. Accordingly, when the child safety seat 100 is installed in a rearward facing configuration, the belt restraining member 132 can still clamp an anchoring belt passing through the two openings 114 while the two guards 172 substantially close the two openings 114.

Likewise, the two guards 174 are respectively disposed at a left and a right side of the panel 150 of the belt restraining member 134, near the two sidewalls 112. The two guards 174 can be respectively connected fixedly with the left and right side of the panel 150, e.g., via two arms 178. In this manner, the two guards 174 can move in unison with the belt restraining member 134 to respectively open or close the two openings 116 when the belt restraining member 134 is pivotally switched between the release state and the clamping state. In particular, the two guards 174 can substantially close the two openings 116 when the belt restraining member 134 is in the clamping state (as shown in FIG. 5), and substantially open the two openings 116 when the belt restraining member 134 is in the release state (as shown in FIG. 4). When the two guards 174 close the two openings 116, a narrow slit can be left between the border of each guard 174 and a rim of the corresponding opening 116 for passage of an anchoring belt. Accordingly, when the child safety seat 100 is installed in a forward facing configuration, the belt restraining member 134 can still clamp an anchoring belt passing through the two openings 116 while the two guards 174 substantially close the two openings 116.

The two sets of guards 172 and 174 can respectively close the two belt paths through the openings 114 and 116 for preventing erroneous installation of an anchoring belt. For example, suppose that the child safety seat 100 is to be installed in the rearward facing configuration. In this case, a caregiver only needs to operate the belt restraining member 132, and the belt restraining member 134 can be kept in the clamping state, which results in the two openings 116 being substantially closed by the two guards 174. This can prevent a caregiver from erroneously threading an anchoring belt through the two openings 116 for attaching the child safety seat 100 in the rearward facing configuration.

If the child safety seat 100 were to be installed in the forward facing configuration, a caregiver only needs to operate the belt restraining member 134, and the belt restraining member 132 can be kept in the clamping state, which results in the two openings 114 being substantially closed by the two guards 172. This can prevent a caregiver from erroneously threading an anchoring belt through the two openings 114 for attaching the child safety seat 100 in the forward facing configuration.

Advantages of the structures described herein include the ability to provide a belt tensioning mechanism that is easy to operate and can provide proper tension in an anchoring belt for securely attaching a child safety seat on a vehicle seat in a rearward or forward facing configuration. Moreover, the tensioning belt tensioning mechanism can include a safety feature that can close multiple belt paths in the child safety seat for preventing erroneous installation of an anchoring belt.

Realizations of the child safety seats have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child safety seat comprising:
   a seat shell having a shell surface, a first opening for passage of an anchoring belt to attach the child safety seat on a vehicle seat in a first configuration, and a second opening for passage of an anchoring belt to attach the child safety seat on a vehicle seat in a second configuration different from the first configuration, the first and second configurations including a rearward facing configuration and a forward facing configuration;
   a first and a second belt restraining member respectively connected with the seat shell, each of the first and second belt restraining members respectively having a clamping state for pressing an anchoring belt adjacently to the shell surface, and a release state for facilitating installation or removal of the anchoring belt;
   a first latch and a second latch respectively assembled with the seat shell and operable independently from each other, the first latch engaging with the first belt restraining member to lock the first belt restraining member in the clamping state, and the second latch engaging with the second belt restraining member to lock the second belt restraining member in the clamping state; and
   a first release actuator assembled with the first belt restraining member and exposed outward, and a second release actuator assembled with the second belt restraining member and exposed outward, the first release actuator being operable to push the first latch in movement for unlocking the first belt restraining member, and the second release actuator being operable to push the second latch in movement for unlocking the second belt restraining member;
   wherein each of the first and second belt restraining members is independently rotatable relative to the seat shell between the release state and the clamping state, the first belt restraining member being rotatable to the clamping state for pressing against an anchoring belt passing through the first opening, and the second belt restraining member being rotatable to the clamping state for pressing against an anchoring belt passing through the second opening.

2. The child safety seat according to claim 1, wherein each of the first and second belt restraining members has a free end, and the first and second latch respectively engage with the first and second belt restraining member at the respective free end thereof.

3. The child safety seat according to claim 1, wherein the first and second belt restraining members are respectively connected pivotally with the seat shell about a first and a second pivot axis, the first belt restraining member having a first end edge generally parallel to the first pivot axis, the second belt restraining member having a second end edge generally parallel to the second pivot axis, and the first and second latches respectively engaging with the first and second end edges to respectively lock the first and second belt restraining members in the clamping state.

4. The child safety seat according to claim 1, wherein the seat shell further has a first and a second recess, the first belt restraining member and the second belt restraining member being respectively received at least partially in the first and second recess in the clamping state, and the first and second latches are assembled with the seat shell in a region located between the first and second recess.

5. The child safety seat according to claim 1, wherein at least one of the first and second latches is pivotally connected with the seat shell.

6. The child safety seat according to claim 1, wherein the first and second latches are spring biased toward a locking state for respectively engaging with the first and second belt restraining member.

7. The child safety seat according to claim 1, wherein the first release actuator is movable between a first position retracted toward an interior of the first belt restraining member and a second position protruding outward at an end edge of the first belt restraining member for urging an unlocking displacement of the first latch, the first release actuator being spring biased toward the first position.

8. The child safety seat according to claim 1, wherein the first belt restraining member has a first guard and the second belt restraining member has a second guard, the first guard being movable to open or close the first opening, and the second guard being movable to open or close the second opening.

9. The child safety seat according to claim 8, wherein the first guard is movable in unison with the first belt restraining member when the first belt restraining member is switched between the release state and the clamping state, and the second guard is movable in unison with the second belt restraining member when the second belt restraining member is switched between the release state and the clamping state.

10. The child safety seat according to claim 8, wherein the first guard substantially closes the first opening when the first belt restraining member is in the clamping state and substantially opens the first opening when the first belt restraining member is in the release state, and the second guard substantially closes the second opening when the second belt restraining member is in the clamping state and substantially opens the second opening when the second belt restraining member is in the release state.

11. The child safety seat according to claim 8, wherein at least the first belt restraining member includes a panel, and the first guard is connected with a side of the panel.

12. The child safety seat according to claim 1, wherein the seat shell includes a seat portion, a backrest portion, and a sidewall extending along a side of the seat portion and the backrest portion, the first and second openings being respectively provided through the sidewall in a first and a second region respectively corresponding to the seat portion and the backrest portion.

13. A child safety seat comprising:
a seat shell having a shell surface, and an opening for passage of an anchoring belt to attach the child safety seat on a vehicle seat;
a belt restraining member connected with the seat shell and disposed in a region overlapping with a belt path passing through the opening, the belt restraining member having a clamping state for pressing an anchoring belt adjacently to the shell surface, and a release state for facilitating installation or removal of the anchoring belt; and
a guard connected with the belt restraining member, the guard being movable to open and close the opening.

14. The child safety seat according to claim 13, wherein the belt restraining member includes a panel, and the guard is connected with a side of the panel.

15. The child safety seat according to claim 13, wherein the guard is movable in unison with the belt restraining member when the belt restraining member is switched between the release state and the clamping state.

16. The child safety seat according to claim 13, wherein the guard substantially closes the opening when the belt restraining member is in the clamping state and substantially opens the opening when the belt restraining member is in the release state.

17. The child safety seat according to claim 13, wherein the opening is provided at a location near a front of the seat shell, or at a location adjacent to a backrest portion of the seat shell.

18. The child safety seat according to claim 13, wherein the seat shell is assembled with a latch, the latch engaging with the belt restraining member to lock the belt restraining member in the clamping state.

19. The child safety seat according to claim 18, wherein the belt restraining member is assembled with a release actuator exposed outward, the release actuator being operable to push the latch in movement for unlocking the belt restraining member.

20. The child safety seat according to claim 19, wherein the release actuator is movable between a first position retracted toward an interior of the belt restraining member and a second position protruding outward at an end edge of the belt restraining member for urging an unlocking displacement of the latch, the release actuator being spring biased toward the first position.

21. The child safety seat according to claim 1, further including a spring respectively connected with the seat shell and the first belt restraining member, the spring biasing the first belt restraining member to the release state.

* * * * *